US012143973B2

(12) United States Patent
Irukulapati et al.

(10) Patent No.: US 12,143,973 B2
(45) Date of Patent: *Nov. 12, 2024

(54) TIMING ADVANCE OFFSET FOR UPLINK-DOWNLINK SWITCHING IN NEW RADIO

(71) Applicant: TELEFONAKTIEBOLAGET LM ERICSSON (PUBL), Stockholm (SE)

(72) Inventors: Naga Vishnu Kanth Irukulapati, Västra Frölunda (SE); Zhipeng Lin, Nanjing (CN); Asbjörn Grövlen, Stockholm (SE); Henrik Sahlin, Mölnlycke (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/522,008

(22) Filed: Nov. 28, 2023

(65) Prior Publication Data
US 2024/0098716 A1 Mar. 21, 2024

Related U.S. Application Data

(63) Continuation of application No. 17/409,539, filed on Aug. 23, 2021, now Pat. No. 11,832,228, which is a (Continued)

(30) Foreign Application Priority Data

Nov. 10, 2017 (WO) ............... PCT/CN2017/110528
Apr. 24, 2018 (WO) ............... PCT/CN2018/084177

(51) Int. Cl.
*H04W 72/0446* (2023.01)
*H04L 5/14* (2006.01)
(Continued)

(52) U.S. Cl.
CPC ........... *H04W 72/0446* (2013.01); *H04L 5/14* (2013.01); *H04W 56/0045* (2013.01); *H04B 7/2643* (2013.01); *H04W 84/042* (2013.01)

(58) Field of Classification Search
None
See application file for complete search history.

(56) References Cited

U.S. PATENT DOCUMENTS

| 11,102,777 B2 * | 8/2021 | Irukulapati ............... H04L 5/14 |
| 2004/0151143 A1 * | 8/2004 | Abdesselem ....... H04W 36/304 370/347 |

(Continued)

FOREIGN PATENT DOCUMENTS

| CN | 101572577 A | 11/2009 |
| CN | 103314613 A | 9/2013 |

(Continued)

OTHER PUBLICATIONS

3GPP TS 36.211 V14.2.0, "LTE; Evolved Universal Terrestrial Radio Access (E-UTRA); Physical channels and modulation (3GPP TS 36.211 version 14.2.0 Release 14)," section 6 Downlink, 3GPP TS 36.211 V14.2.0, pp. 76-154.

(Continued)

*Primary Examiner* — Nguyen H Ngo

(57) ABSTRACT

The embodiments herein relate to timing advance offset for uplink/downlink switching in New Radio (NR). In one embodiment, there proposes a method in a wireless communication device, comprising: determining a timing advance (TA) offset for uplink/downlink switching, wherein the TA offset is at least based on the time offset requirement for uplink/downlink switching in different scenarios used in communication between the wireless communication device and a network node; applying the determined TA offset in the uplink communication from the wireless communication
(Continued)

device to the network node. With embodiments herein, uplink/downlink switching time for NR is defined.

18 Claims, 12 Drawing Sheets

Related U.S. Application Data continuation of application No. 16/163,401, filed on Oct. 17, 2018, now Pat. No. 11,102,777.

(51) Int. Cl.
*H04W 56/00* (2009.01)
*H04B 7/26* (2006.01)
*H04W 84/04* (2009.01)

(56) References Cited

U.S. PATENT DOCUMENTS

| | | |
|---|---|---|
| 2014/0044108 A1 | 2/2014 | Earnshaw et al. |
| 2015/0090262 A1 | 4/2015 | Glusker et al. |
| 2015/0139142 A1 | 5/2015 | Dinan |
| 2015/0230268 A1 | 8/2015 | Chen et al. |
| 2016/0020891 A1 | 1/2016 | Jung et al. |
| 2016/0044584 A1 | 2/2016 | Jung et al. |
| 2016/0174177 A1 | 6/2016 | Frederiksen et al. |
| 2016/0219547 A1 | 7/2016 | Seo et al. |
| 2017/0215157 A1 | 7/2017 | Yang et al. |
| 2017/0290014 A1 | 10/2017 | Kim et al. |
| 2018/0352527 A1 | 12/2018 | Wang et al. |
| 2019/0053182 A1 | 2/2019 | Choi et al. |
| 2019/0090262 A1 | 3/2019 | Yan et al. |
| 2019/0174516 A1* | 6/2019 | Shimezawa ....... H04W 72/1263 |
| 2019/0357264 A1 | 11/2019 | Yi et al. |

FOREIGN PATENT DOCUMENTS

| | | |
|---|---|---|
| CN | 105027640 A | 11/2015 |
| CN | 105519014 A | 4/2016 |
| CN | 105981325 A | 9/2016 |
| CN | 106165505 A | 11/2016 |
| CN | 106797618 A | 5/2017 |
| JP | 2017511030 A | 4/2017 |
| WO | 2015119846 A1 | 8/2015 |
| WO | 2017139014 A1 | 8/2017 |

OTHER PUBLICATIONS

Ericsson, "Even Further Analysis of UE Initial Transmit Timing Requirement", 3GPP TSG RAN WG4 Meeting #85, R4-1713648, Nov. 27-Dec. 1, 2017, Reno, USA.

Ericsson, R4-1708380 "Further Analysis of UE Initial Transmit Timing Requirement" 3GPP TSG RAN WG4 Meeting #84, R4-1708380, Aug. 21-25, 2017, Berlin, Germany.

Ericsson, R4-1711312 "Further Analysis of UE Initial Transmit Timing Requirement", 3GPP TSG RAN WG4 Meeting #84bis, R4-1711312, Dubrovnik, Croatia, Oct. 9- 13, 2017.

Ericsson, R4-1711521 "TP to TS 38.101-1 v0.0.1: ON/OFF time masks (Section 6.3.3)", 3GPP TSG-RAN WG4 Meeting #84bis, R4-1711521, Oct. 9-13, 2017, Dubrovnik, Croatia.

Ericsson, R4-1711522 "TP to TS 38. 101-2 v0.0.1: ON/OFF time masks (Section 6.3.3)", 3GPP TSG-RAN WG4 Meeting #84bis, R4-1711522, Oct. 9-13, 2017, Dubrovnik, Croatia.

Ericsson, R4-1714501 "TP to TS 38.133 v0.3.0: UE Timing Offset Requirements", 3GPP TSG RAN WG4 Meeting #85, R4-1714501, Reno, USA, Nov. 27-Dec. 1, 2017.

Parkvall, Draft "3rd Generation Partnership Project; Technical Specification Group Radio Access Network; NR; Physical channels and modulation(Release 15)", R1-1719105, Draft 3GPP TS 38.211 V1.1.0, Oct. 2017.

* cited by examiner

TIMING ADVANCE OFFSET FOR UPLINK-DOWNLINK SWITCHING IN NEW RADIO

CROSS-REFERENCE TO RELATED APPLICATIONS

This application is a continuation application of U.S. patent application Ser. No. 17/409,539, filed Aug. 23, 2021, granted as U.S. Pat. No. 11,832,228 on Nov. 28, 2023, which is a continuation application of U.S. patent application Ser. No. 16/163,401, filed Oct. 17, 2018, granted as U.S. Pat. No. 11,102,777 on Aug. 24, 2021, which claims priority to PCT/CN2018/084177, filed Apr. 24, 2018 and PCT/CN2017/110528 filed on Nov. 10, 2017, the disclosure of which are hereby incorporated by references in their entireties.

TECHNICAL FIELD

The embodiments herein relate generally to wireless communication, and more particularly, the embodiments herein relate to timing advance offset for uplink/downlink switching in New Radio (NR).

BACKGROUND

In order to preserve the orthogonality in the uplink (UL), the UL transmissions from multiple user equipments (UEs) need to be time aligned at a network node, such as a base station, the eNodeB or the like. This means that the transmit timing of the UEs in the same cell should be adjusted to ensure that their signals arrive at the eNodeB receiver at the same time. In order to perform this adjustment, Timing Advance (TA) is defined to specifying the advance of the uplink frame relative to the downlink (DL) frame.

In Long-Term Evolution (LTE), TA offset for uplink/downlink switching is further introduced in third Generation Partnership Project (3GPP) Technical Specification TS 36.211. FIG. 1 shows conventional timing advance of the uplink transmission before the downlink transmission. As shown in FIG. 1, transmission of the uplink radio frame number i from the UE may start $(N_{TA}+N_{TA\ offset}) \times T_s$ seconds before the start of the corresponding downlink radio frame at the UE, where $0 \leq N_{TA} \leq 4096$ if the UE is configured with a Secondary Cell Group (SCG), and $0 \leq N_{TA} \leq 20512$ otherwise. Note that $T_s=1/(30.72*10^6)$. For frame structure type 1, $N_{TA\ offset}=0$, and for frame structure type 2, $N_{TA\ offset}=624$, unless stated otherwise. Note that not all slots in a radio frame may be transmitted. One example hereof is TDD, where only a subset of the slots in a radio frame is transmitted.

SUMMARY

The latest specifications of NR provide no TA offset description for uplink/downlink. Only the TA is considered as below. Downlink and uplink transmissions are organized into frames with $T_f=(\Delta f_{max}N_f/100) \times T_c=10$ ms duration, consisting of ten subframes of $T_{sf}(\Delta f_{max}N_f/1000) \times T_c=1$ ms duration each. The number of consecutive Orthogonal Frequency Division Multiplexing (OFDM) symbols per subframe is $N_{symb}^{subframe\mu}=N_{symb}^{slot}N_{slot}^{subframe\mu}$. Each frame is divided into two equally-sized half-frames of five subframes each with half-frame 0 consisting of subframes 0-4 and half-frame 1 consisting of subframes 5-9. The term "uplink/downlink switching" (alternatively "uplink-downlink switching") can refer to switching from downlink to uplink or uplink to downlink, e.g. in TDD operation.

There is one set of frames in the uplink and one set of frames in the downlink on a carrier. FIG. 2 shows the timing advance of the uplink transmission before the downlink transmission in NR. As shown in FIG. 2, transmission of uplink frame number i from the UE shall start $T_{TA}=N_{TA}T_C$ before the start of the corresponding downlink frame at the UE. Note that $T_c=T_s/64=1/(64*30.72*10^6)$.

So the TA offset should be also considered in TA command itself specified in other specifications or explicitly defined in 38.211 with some constant values for different cases. As a result, some definitions are required to specify the timing reserved for UL/DL switching.

In 3GPP RAN4, the UE transient time in each direction may be 10 µs in below 6 GHz bands and 5 µs in above 6 GHz bands in general. Thus, total switching time for going from DL to UL and UL to DL could be about 20 µs for low bands and 10 µs for high bands.

Embodiments described herein may introduce TA offset in NR. In some embodiments, it is proposed on how to indicate TA offset for uplink/downlink switching in NR. Example embodiments are provided with some examples given for the detail definition, where forward compatibility, frequency dependency, flexibility, message headroom etc. are considered.

In some embodiments, methods in a wireless communication device include determining a timing advance (TA) offset for uplink/downlink switching, wherein the TA offset is at least based on the time offset requirement for uplink/downlink switching in different scenarios used in communication between the wireless communication device and a network node and applying the determined TA offset in the uplink communication from the wireless communication device to the network node.

In some embodiments, methods in network node include determining a timing advance (TA) offset for uplink/downlink switching, wherein the TA offset is at least based on the time offset requirement for uplink/downlink switching in different scenarios used in communication between the network node and a wireless communication device and sending the determined TA offset to the wireless communication device, wherein the TA offset is to be applied in the uplink communication from the wireless communication device to the network node.

In some embodiments, an apparatus may be configured to operate as a wireless communication device that includes at least one processor and a non-transitory computer readable medium coupled to the at least one processor. The non-transitory computer readable medium contains instructions executable by the at least one processor such that the at least one processor is configured to determine a timing advance (TA) offset for uplink/downlink switching. The TA offset is at least based on the time offset requirement for uplink/downlink switching in different scenarios used in communication between the wireless communication device and a network node. Method include applying the determined TA offset in the uplink communication from the wireless communication device to the network node.

In some embodiments, an apparatus configured to operate as a network node includes at least one processor and a non-transitory computer readable medium coupled to the at least one processor. The non-transitory computer readable medium contains instructions executable by the at least one processor, whereby the at least one processor is configured to determine a timing advance (TA) offset for uplink/downlink switching. The TA offset is at least based on the time offset requirement for uplink/downlink switching in different scenarios used in communication between the network node and a wireless communication device. The at least one processor is further configured to send the determined TA offset to the wireless communication device. The TA offset is to be applied in the uplink communication from the wireless communication device to the network node.

Some embodiments disclosed herein are directed to methods in a wireless communication device. Operations in such methods may include determining a timing advance (TA) offset for uplink/downlink switching, wherein the TA offset is based on a time offset requirement for uplink/downlink switching in different configurations used in communication between the wireless communication device and a network node, and applying the determined TA offset in an uplink communication from the wireless communication device to the network node.

In some embodiments, the wireless communication device includes a user equipment (UE).

Some embodiments provide that methods further include receiving a message including the TA offset from the network node. In some embodiments, applying the determined TA offset comprises applying the received TA offset.

In some embodiments, the message is a random access response (RAR) message. Some embodiments provide that the TA offset is included in a TA command (TAC). In some embodiments, the TA offset is predefined constant value, for a particular frequency band and a particular frame structure. Some embodiments provide that the particular frame structure comprises one of a plurality of duplex modes. In some embodiments, the TA offset takes two or three bits in the message.

In some embodiments, applying the TA offset further includes applying a timing advance corresponding to a propagation delay between the wireless communication device and the network node, in addition to the TA offset. Some embodiments provide that the timing advance corresponding to the propagation delay is sent from the network node in a TA command in a RAR message.

In some embodiments, the TA offset value depends on the frequency band. Some embodiments provide that the TA offset has a first TA offset value for a first frequency band that is below a frequency threshold for a time division duplex and a second TA offset value for a second frequency band that is equal to or above the frequency threshold and that the first TA offset value is different than the second TA offset value. Some embodiments provide that the first TA offset value is greater than the second TA offset value. In some embodiments, for non-time division duplex (non-TDD), the TA offset is 0.

Some embodiments provide that the frequency threshold includes about 6 GHz, the first TA offset includes about 20 µs, and the second TA offset includes about 10 µs. In some embodiments, the TA offset is independent of NR-LTE co-existence.

Some embodiments of the present disclosure are directed to methods in a network node. Operations corresponding to such methods include determining a timing advance (TA) offset for uplink/downlink switching, wherein the TA offset is based on a time offset requirement for uplink/downlink switching in different configurations used in communication between the network node and a wireless communication device, and sending the determined TA offset to the wireless communication device. In some embodiments, the TA offset corresponds to an uplink communication from the wireless communication device to the network node.

Some embodiments provide that the TA offset is sent in a random access response (RAR) message. In some embodiments, the TA offset is included in a TA command (TAC). The TA offset may take two or three bits in some example embodiments. Some embodiments include sending a timing advance corresponding to a propagation delay between the wireless communication device and the network node to the wireless communication device, in a TA command in a RAR message.

In some embodiments, the TA offset value depends on the frequency band. Some embodiments provide that the TA offset has a first TA offset value for a first frequency band that is below a frequency threshold for a time division duplex and a second TA offset value for a second frequency band that is equal to or above the frequency threshold, wherein the first TA offset value is different than the second TA offset value. In some embodiments, the first TA offset value is greater than the second TA offset value.

Some embodiments provide that the TA offset is 0 for non-time division duplex (non-TDD). In some embodiments, the frequency threshold is about 6 GHz, the first TA offset is about 20 µs, and the second TA offset is about 10 µs.

In some embodiments, the TA offset is predefined constant value, for a particular frequency band and a particular frame structure. In some embodiments, the TA offset is independent of NR-LTE co-existence.

Some embodiments of the present disclosure are directed to an apparatus that is configured to operate as a wireless communication device. The device includes at least one processor and a non-transitory computer readable medium coupled to the at least one processor, the non-transitory computer readable medium containing instructions executable by the at least one processor. The at least one processor is configured to perform operations of methods disclosed herein.

Some embodiments of the present disclosure are directed to a computer readable medium that includes computer readable code, which when run on an apparatus, causes the apparatus to perform operations corresponding to methods disclosed herein.

In further embodiments, there proposes a computer readable medium comprising computer readable code, which when run on an apparatus, causes the apparatus to perform any of the above methods.

With embodiments herein, uplink/downlink switching time for NR may be defined.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements, and in which.

DETAILED DESCRIPTION

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other.

Reference to "one embodiment" or "an embodiment" means that a particular feature, structure or characteristic described in connection with the embodiment is included in at least one embodiment. Thus, the appearances of the phrase "in one embodiment" appearing in various places throughout the specification are not necessarily all referring to the same embodiment.

Figure 1:
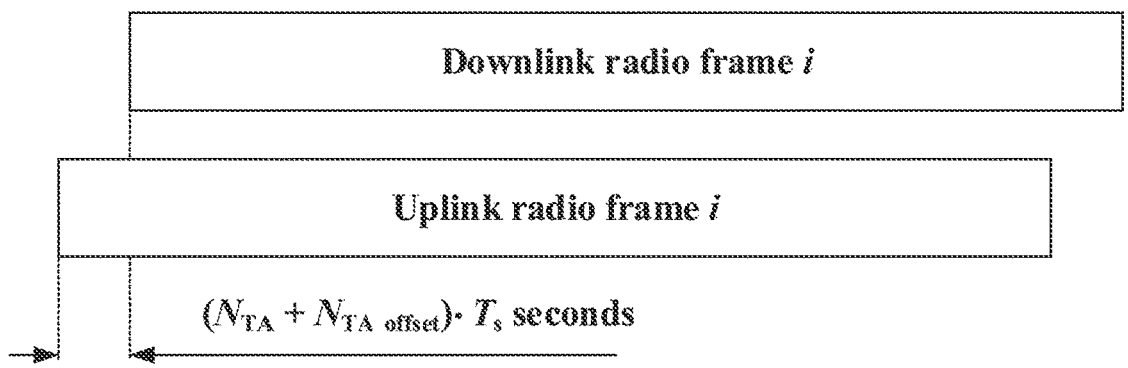
FIG. 1 shows the timing advance of the uplink transmission before the downlink transmission according to the prior art.
Figure 2:
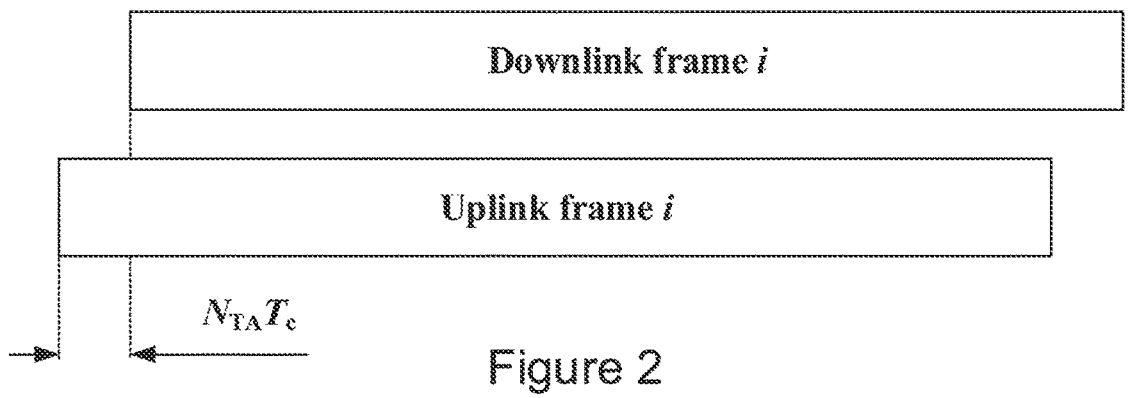
FIG. 2 shows the timing advance of the uplink transmission before the downlink transmission in NR.
Figure 3:
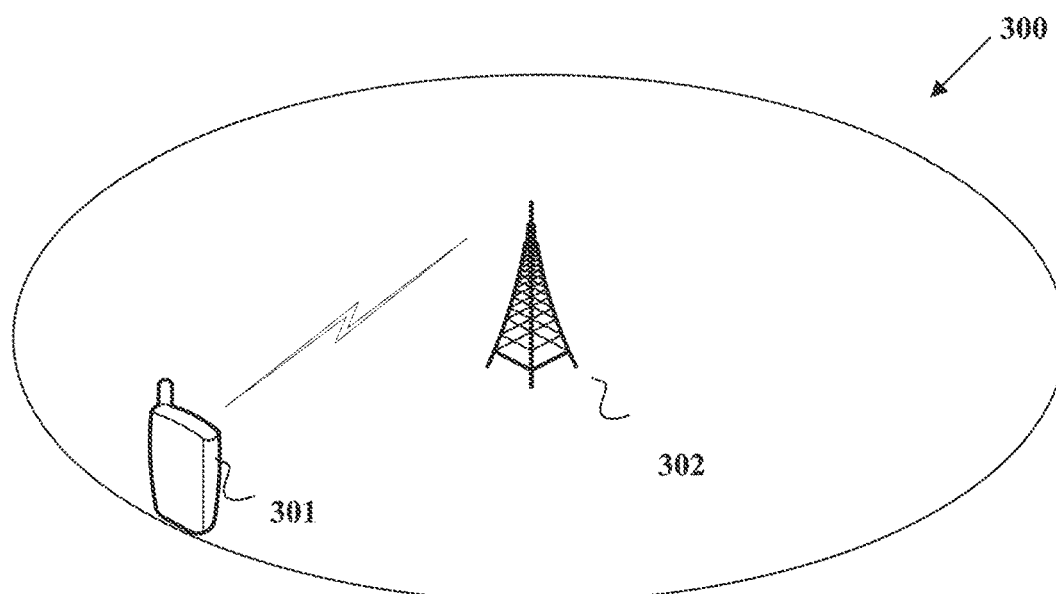
FIG. 3 shows a schematic diagram of an example wireless communication system, in which the embodiments can be implemented.

FIG. 3 shows a schematic diagram of an example wireless communication system 300, in which the embodiments can be implemented. In some embodiments, the wireless communication system 300 may include at least one wireless communication device 301 and at least one network node 302. However, the embodiments herein do not limit the number of the wireless communication device 301 and the network node 302.

In some embodiments, the wireless communication system 300 may be embodied as for example UE, device to device (D2D) UE, proximity capable UE (i.e., ProSe UE), machine type UE or UE capable of machine to machine (M2M) communication, Personal Digital Assistant (PDA), PAD, Tablet, mobile terminals, smart phone, laptop embedded equipped (LEE), laptop mounted equipment (LME), USB dongles, etc.

In some embodiments, the network node 302 may embodied as for example eNodeB (eNB), Base Station (BS), network controller, radio network controller (RNC), base station controller (BSC), relay, donor node controlling relay, base transceiver station (BTS), access point (AP), transmission points, transmission nodes, etc.

Embodiments herein, which will be described by referring to FIG. 3, introduce TA offset in NR, and three example embodiments are given below. In each example embodiment, embodiments are also provided assuming for example around 20 µs in maximum may be used for the TA offset value.

Some systems, such as those that may conform to 3GPP, include some working assumptions related to the initial TA command used for Random Access Response (RAR), including a maximum size of TA Command (TAC, Timing Advance Command) for RAR is 12 bits and that for the timing advance in RAR, the granularity may depend on the subcarrier spacing of the first uplink transmission after RAR (see the following table 1). Note that $T_c=1/(64*30.72*10^6)$ seconds. For example, Table 1 as provided below illustrates the granularity $T_u$ of a 12 bit TA command:

TABLE 1

Granularity $T_u$ of [12] bits TA command.

| Subcarrier Spacing (kHz) of the first uplink transmission after RAR | Unit $T_u$ |
| --- | --- |
| 15 | 16 * 64 $T_c$ |
| 30 | 8 * 64 $T_c$ |
| 60 | 4 * 64 $T_c$ |
| 120 | 2 * 64 $T_c$ |

In some embodiments, a TA offset may be specified in 3GPP TS 38.211 similar to what has been done in 36.211 for LTE, but with different values, for example, for below 6 GHz and above 6 GHz frequency bands.

In some embodiments, a constant time may be defined for different frame structures and different frequency bands. Below is an example assuming the offset value is around 20 µs for below 6 GHz case and 10 µs for above 6 GHz case.

| TA offset is |
| --- |
| 624 * 64 $T_c$: TDD in band below 6 GHz |
| 312 * 64 $T_c$: TDD in band above 6 GHz |
| 0: non-TDD case |

In some embodiments, the TA offset for 6 GHz frequency band can be set by referring the case of below 6 GHz or the case of above 6 GHz. For example, the TA offset for 6 GHz frequency band can be set as 10 µs or 312*64 $T_c$.

Note that, the embodiments do not limit to the above definition of TA offset. In some embodiments, the TA offset is at least based on the time offset requirement for uplink/downlink switching in different scenarios used in communication between the wireless communication device and a network node. The different scenarios may include but not be limited to different frame structures, different frequency band, coexisting with LTE, etc. For example, in some embodiments, the TA offset is predefined constant value, for a particular frequency band and a particular frame structure.

In some embodiments, the wireless communication device 301 can determine the TA offset by using embodiments described above and then applying the determined TA offset in the uplink communication from the wireless communication device 301 to the network node 302.

In some embodiments, when applying the TA offset, the wireless communication device 301 may also apply a timing advance TA corresponding to a propagation delay between the wireless communication device and the network node, in addition to the TA offset, wherein the timing advance TA corresponding to the propagation delay is sent from the network node in a TA command in a RAR message. That is, a timing advance of (TA+TA offset) is applied.

In some embodiments, the TA corresponding to the propagation delay is maintained by the network node 302 through timing advance commands (TACs), i.e., timing alignment commands, sent to the wireless communication device 301 based on measurements on UL transmissions from that wireless communication device 301. For example, some embodiments provide that the network node 302 measures two-way propagation delay or round trip time for each wireless communication device 301 to determine the value of the TA required for that wireless communication device 301.

With the currently discussed example embodiments, the headroom of the message may be saved to transfer the TA command. As such, embodiments may not require any extra bits for transferring the TA offset, even though such embodiments may not be flexible.

In some further embodiments, one or more new parameters that are specific for the TA offset in NR RAR message may be defined. In some embodiments, a new TA offset parameter may be included in for example, the RAR message.

An example is the definition below with 2 bits:

| TA offset (2 bits) |
| --- |
| 00: 0 $T_c$ |
| 01: 312 * 64 $T_c$ |
| 10: 624 * 64 $T_c$ |
| 11: reserved |

Another example of such embodiments may support more values by including a definition as provided below with 3 bits:

| TA offset (3 bits) |
| --- |
| 001: 312 * 64 $T_c$ |
| 010: 156 * 64 $T_c$ |
| 011: 78 * 64 $T_c$ |
| 100: 39 * 64 $T_c$ |
| 101: 20 * 64 $T_c$ |
| 110: 10 * 64 $T_c$ |
| 111: 0 $T_c$ |

In some embodiments, the frequency band definition in RAN4 specification may specify the minimum switching time that the UE may assume. Some embodiments provide that examples include 0 for non-TDD (such as FDD) band; 624*64 $T_c$: TDD in band below 6 GHz; and/or 312*64 $T_c$: TDD in band above 6 GHz.

In some embodiments, the TA offset for 6 GHz frequency band can be set by referring the case of below 6 GHz or the case of above 6 GHz. For example, the TA offset for 6 GHz frequency band can be set as 10 µs or 312*64 $T_c$.

Note that, such embodiments may not limit to the above definition of TA offset. In some embodiments, the TA offset may be based, at least partially, on the time offset requirement for uplink/downlink switching in different scenarios used in communication between the wireless communication device and a network node. The different scenarios may include but are not limited to different frame structures, different frequency band, coexisting with LTE, etc.

In some embodiments, the wireless communication device 301 can determine the TA offset by using the TA offset received from the network node 302 (referring to above embodiments), and then apply the determined TA offset in the uplink communication from the wireless communication device 301 to the network node 302.

Accordingly, in some embodiments, the network node 302 may determine a timing advance (TA) offset for uplink/downlink switching, wherein the TA offset is at least based on the time offset requirement for uplink/downlink switching in different scenarios used in communication between the network node and a wireless communication device; and then send the determined TA offset to the wireless communication device in a message (such as RAR), wherein the TA offset is to be applied in the uplink communication from the wireless communication device to the network node.

Note that, the message carrying the TA offset is not limited to the RAR message. In some embodiments, the TA offset can be sent from the network node 302 to the wireless communication device 301 in any message and/or type thereof.

Note that the quantity of bits used by the TA offset is not limited to 2 or 3 bits. In some embodiments, the TA offset can use any number of bits.

In some embodiments, when applying the TA offset, the wireless communication device 301 may also apply a timing advance TA corresponding to a propagation delay between the wireless communication device and the network node, in addition to the TA offset. In some embodiments, the timing advance TA corresponding to the propagation delay may be sent from the network node in a TA command in a RAR message. In such embodiments a timing advance of (TA+TA offset) may be applied.

Accordingly, in some embodiments, the network node 302 may further send a timing advance corresponding to a propagation delay between the wireless communication device and the network node to the wireless communication device, in a TA command in a RAR message.

In some embodiments, the TA corresponding to the propagation delay may be maintained by the network node 302 through timing advance commands (TACs). Examples may include timing alignment commands, sent to the wireless communication device 301 based on measurements on UL transmissions from that wireless communication device 301. For example, the network node 302 may measure two-way propagation delay or round trip time for each wireless communication device 301 to determine the value of the TA required for that wireless communication device 301.

Some embodiments described above may be more flexible and future proof. For example, embodiments may be forward compatible and independent from the estimated TA values due to propagation delay but may use one or more bits the transfer the TA offset.

In yet other embodiments, there includes the TA offset in the TA command in NR RAR message. For example, such embodiments may provide that the TA command contains both of the estimated TA values based on the uplink transmission and the TA offset for UL/DL switching.

Some systems, such as those that may conform to 3GPP, include identified msg3 Subcarrier Spacing (SCS). Such agreements may provide that NR supports RACH configuration in RMSI containing 1 bit to convey SCS of Msg3, in less than 6 GHz, subcarrier spacing of Msg3 can be either 15 or 30 kHz, and in greater that 6 GHz, subcarrier spacing of Msg3 can be either 60 or 120 kHz.

In such embodiments, since the TA offset will be merged into the TA command, the embodiments could use same granularity for different SCS as indicated in Table 1 above.

Some embodiments provide that the TA offset values may be defined in a manner consistent with the example values provided in Table 2, below. Note that $T_u$ is defined in Table 1 for each SCS.

TABLE 2

TA_offset in TA command

| Subcarrier Spacing (kHz) of the first uplink transmission after RAR | TA_offset |
|---|---|
| 15 kHz | 39 $T_u$ |
| 30 kHz | 78 $T_u$ |
| 60 kHz | 78 $T_u$ |
| 120 kHz | 156 $T_u$ |

In some embodiments, the frequency band definition in RAN4 specification may specify the minimum switching time the UE may assume where the values could for example be 0 for non-TDD (such as FDD) band, 624*64 $T_c$: TDD in band below 6 GHz, 312*64 $T_c$: TDD in band above 6 GHz.

In some embodiments, the TA offset for 6 GHz frequency band can be set by referring the case of below 6 GHz or the case of above 6 GHz. For example, the TA offset for 6 GHz frequency band can be set as 10 μs or 312*64 $T_c$.

Such embodiments do not limit to the above definition of TA offset. For example, some embodiments provide that the TA offset is at least based on the time offset requirement for uplink/downlink switching in different scenarios used in communication between the wireless communication device and a network node. The different scenarios may include but are not limited to different frame structures, different frequency bands, and/or coexisting with LTE, among others.

In some embodiments, the wireless communication device 301 can determine the TA offset by using the TA offset in the TAC field of RAR message received from the network node 302, and the wireless communication device 301 can also determine a timing advance TA corresponding to a propagation delay between the wireless communication device and the network node by referring the above TAC field. Then, the wireless communication device 301 may apply the determined TA offset and TA corresponding to a propagation delay in the uplink communication from the wireless communication device 301 to the network node 302. In such embodiments, a timing advance of (TA+TA offset) is applied.

Accordingly, in some embodiments, the network node 302 may determine a timing advance (TA) offset for uplink/downlink switching. For example, the TA offset may be at least based on the time offset requirement for uplink/downlink switching in different scenarios used in communication between the network node and a wireless communication device. Some embodiments provide that the network node 302 may determine a timing advance corresponding to a propagation delay between the wireless communication device and the network node to the wireless communication device. Then, the network node 302 may merge the determined TA offset and the TA corresponding to a propagation delay into TAC field of RAR message, and then send it to the wireless communication device 301.

In some embodiments, the TA corresponding to the propagation delay is maintained by the network node 302 through timing advance commands (TACs), i.e., timing alignment commands, that may be sent to the wireless communication device 301 based on measurements on UL transmissions from that wireless communication device 301. For example, the network node 302 measures two-way propagation delay and/or round-trip time for each wireless communication device 301 to determine the value of the TA required for that wireless communication device 301.

Such embodiments may be more flexible and may save headroom of the message to transfer the TA command. Additionally, the TA command may be transparent to UE. Such embodiments may be based on the condition that the agreed number of TA command bits (e.g. 12 bits) is enough to transfer both the TA and the TA offset.

Figure 4:
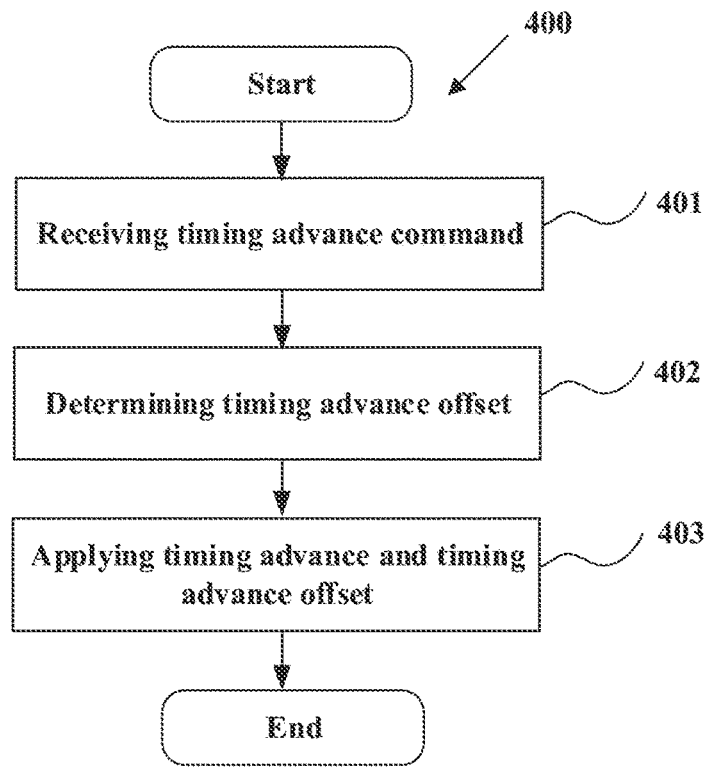
FIG. 4 is a schematic flow chart showing a method in wireless communication device, according to the embodiments.

Reference is now made to FIG. 4, which is a schematic flow chart showing a method 400 in wireless communication device 301, according to some embodiments.

The method 400 may begin with block 401, receiving timing advance command in RAR message from the network node 302. In some embodiments, the timing advance command may include timing advance (TA) offset and the timing advance corresponding to the propagation delay. In some other embodiments, the timing advance command may include only the timing advance corresponding to the propagation delay. In some embodiments, the wireless communication device 301 may receive the TA offset in any field in RAR message or in any other message sent from the network node 302. In some embodiments, the TA offset may take for example but not limit to two or three bits in the message.

In some embodiments, the TA corresponding to the propagation delay is maintained by the network node 302 through timing advance commands (TACs), i.e., timing alignment commands, sent to the wireless communication device 301 based on measurements on UL transmissions from that wireless communication device 301. For example, the network node 302 may measure two-way propagation delay or round-trip time for each wireless communication device 301 to determine the value of the TA required for that wireless communication device 301.

In some embodiments, the method 400 may proceed to block 402, the wireless communication device 301 may determine a timing advance (TA) offset for uplink/downlink switching. In some embodiments, the wireless communication device 301 may determine the TA offset itself. In some other embodiments, the wireless communication device 301 may determine the TA offset by using the TA offset received from the network node 302.

In some embodiments, the TA offset is at least based on the time offset requirement for uplink/downlink switching in different scenarios used in communication between the wireless communication device and a network node. The different scenarios can be for example but not limited to different frame structures, different frequency band, coexisting with LTE, etc.

For example, in some embodiments, there defines constant time for different frame structures and different frequency band. In some embodiments, for TDD, the TA offset value is around 20 μs for below 6 GHz case and 10 μs for above 6 GHz case. For non-TDD (such as FDD), the TA offset value is 0.

In some embodiments, the frequency band definition in a RAN4 specification would specify the minimum switching time that the UE may assume. Examples values may include 0 for non-TDD (such as FDD) band, 624*64 $T_c$: TDD in band below 6 GHz, and/or 312*64 $T_c$: TDD in band above 6 GHz.

In some embodiments, the TA offset for 6 GHz frequency band can be set by referring the case of below 6 GHz or the case of above 6 GHz. For example, the TA offset for 6 GHz frequency band can be set as 10 μs or 312*64 $T_c$.

In some embodiments, the method 400 may proceed to block 403 in which the wireless communication device 301 may apply the TA offset and the TA corresponding to the propagation delay, i.e., (TA+TA offset), in the uplink communication from the wireless communication device to the network node.

Figure 5:
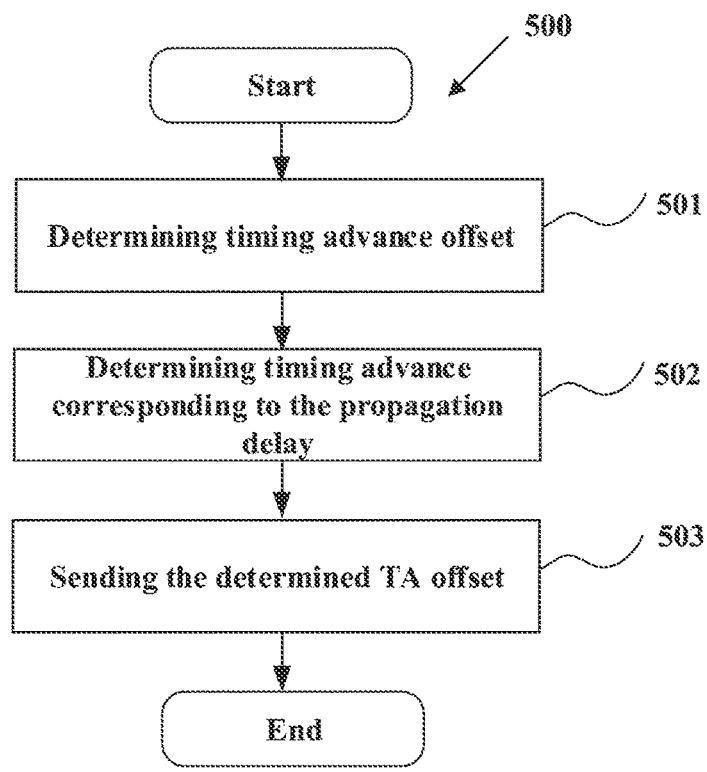
FIG. 5 is a schematic flow chart showing a method in network node, according to the embodiments.

Reference is now made to FIG. 5, which is a schematic flow chart showing a method 500 in network node 302, according to some embodiments.

The method 500 may begin with the operation of block 501, which is determining a timing advance (TA) offset for uplink/downlink switching. In some embodiments, the TA offset is to be applied in the uplink communication from the wireless communication device 301 to the network node 302. In some embodiments, the network node 302 may determine the TA offset at least based on the time offset requirement for uplink/downlink switching in different scenarios used in communication between the wireless communication device and a network node. The different scenarios may include, for example, but are not limited to different frame structures, different frequency band, coexisting with LTE, etc.

For example, in some embodiments, a constant time is defined for different frame structures and different frequency band. In one embodiment, for TDD, the TA offset value is around 20 μs for below 6 GHz case and 10 μs for above 6 GHz case. For non-TDD (such as FDD), the TA offset value is 0.

In one embodiment, the frequency band definition may be specified as the minimum switching time the UE may assume. Some embodiments provide the values may be, for example, 0 for non-TDD (such as FDD) band, 624*64 $T_c$: TDD in band below 6 GHz, and/or 312*64 $T_c$: TDD in band above 6 GHz.

In some embodiments, the TA offset for 6 GHz frequency band can be determined by referring the case of below 6 GHz or the case of above 6 GHz. For example, the TA offset for 6 GHz frequency band can be determined as 10 μs or 312*64 $T_c$.

In some embodiments, the method 500 may perform operations of block 502, which include determining, by the network node 502, the timing advance TA corresponding to the propagation delay.

In some embodiments, the TA corresponding to the propagation delay is maintained by the network node 302 through timing advance commands (TACs) that are sent to the wireless communication device 301 based on measurements on UL transmissions from that wireless communication device 301. Examples of TACs may include timing alignment commands, among others. For example, the network node 302 may measure two-way propagation delay and/or round-trip time for each wireless communication device 301 to determine the value of the TA required for that wireless communication device 301.

In one embodiment, the method 500 may include operations of block 503, which include sending, by the network node 502, the determined TA offset to the wireless communication device 301. In some embodiments, the determined TA offset and the timing advance corresponding to the propagation delay are merged into the Timing Advance (TA) command, and sent in the RAR message. In some other embodiments, the determined TA offset may be sent in any other message, and the timing advance command may include only the timing advance corresponding to the propagation delay. In yet further embodiments, the determined TA offset can be sent in any field in RAR message or in any other message to the wireless communication device. In some embodiments, the TA offset may use, for example, 2 or three bits, however, such examples are non-limiting as the TA offset may use more than three bits according to some embodiments.

Figure 6:
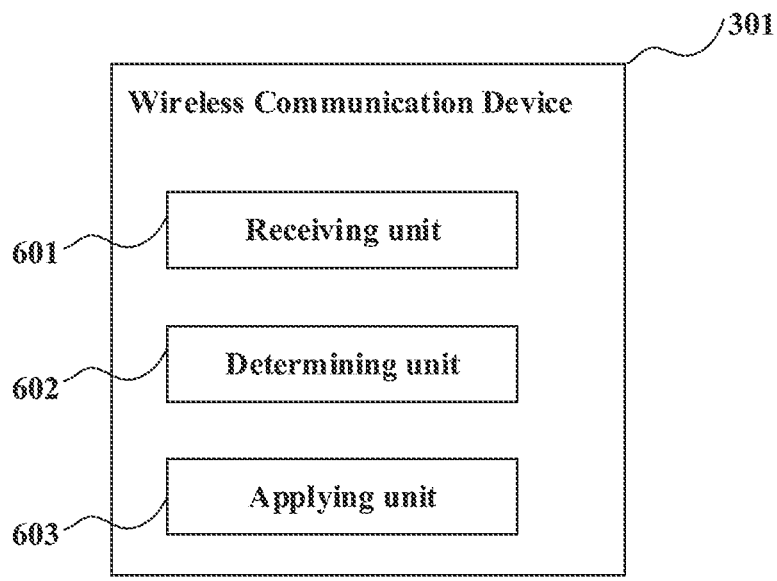
FIG. 6 is a schematic block diagram showing an example wireless communication device, according to the embodiments.

Reference is now made to FIG. 6, which is a schematic block diagram showing an example wireless communication device 301, according to some embodiments. In some embodiments, the wireless communication device 301 may include but is not limited to a receiving unit 601, a determining unit 602, and an applying unit 603. In some embodiments, the receiving unit 601, the determining unit 602, and the applying unit 603 can be configured to perform operations 410, 402, and 403, respectively, as discussed above regarding FIG. 4.

In some embodiments, the receiving unit 601 may receive timing advance command in RAR message from the network node 302. In some embodiments, the timing advance command may include timing advance (TA) offset and the timing advance corresponding to the propagation delay. In some other embodiments, the timing advance command may include only the timing advance corresponding to the propagation delay. Some embodiments provide that the receiving unit 601 may receive the TA offset in any field in RAR message or in any other message sent from the network node 302. In some embodiments, the TA offset may use, for example, two or three bits in the message, however, such embodiments are non-limiting as the TA offset may use more than three bits in some embodiments.

In some embodiments, the TA corresponding to the propagation delay may be maintained by the network node 302 through timing advance commands (TACs), which may include timing alignment commands, that are sent to the wireless communication device 301 based on measurements on UL transmissions from that wireless communication device 301. For example, the network node 302 may measure two-way propagation delay and/or round-trip time for each wireless communication device 301 to determine the value of the TA required for that wireless communication device 301.

In some embodiments, the determining unit 602 may determine a timing advance (TA) offset for uplink/downlink switching. In some embodiments, the determining unit 602 may determine the TA offset itself. In some other embodiments, the determining unit 602 may determine the TA offset by using the TA offset received from the network node 302.

In some embodiments, the TA offset is at least based on the time offset requirement for uplink/downlink switching in different scenarios used in communication between the wireless communication device and a network node. The different scenarios can include, for example, but are not limited to different frame structures, different frequency band, coexisting with LTE, etc.

For example, in some embodiments, a constant time may be defined for different frame structures and different frequency bands. In some embodiments, for TDD, the TA offset value is around 20 μs for below 6 GHz case and 10 μs for above 6 GHz case. For non-TDD (such as FDD), the TA offset value may be 0.

In some embodiments, the frequency band definition may include a specification regarding the minimum switching time the UE may assume. Some embodiments provide that examples of such embodiments include values of 0 for non-TDD (such as FDD) band, 624*64 $T_c$: TDD in bands below 6 GHz, and 312*64 $T_c$: TDD in bands above 6 GHz.

In one embodiment, the TA offset for 6 GHz frequency band can be set based on the case of below 6 GHz or the case of above 6 GHz. For example, some embodiments provide that the TA offset for 6 GHz frequency band can be set as 10 μs or 312*64 Tc.

In some embodiments, the applying unit 603 may apply the TA offset and the TA corresponding to the propagation delay, i.e., (TA+TA offset), in the uplink communication from the wireless communication device to the network node.

Note that, the receiving unit 601, determining unit 602, and applying unit 603 can implemented by a receiving circuity and/or module, a determining circuity and/or module, and an applying circuity and/or module respectively.

Figure 7:
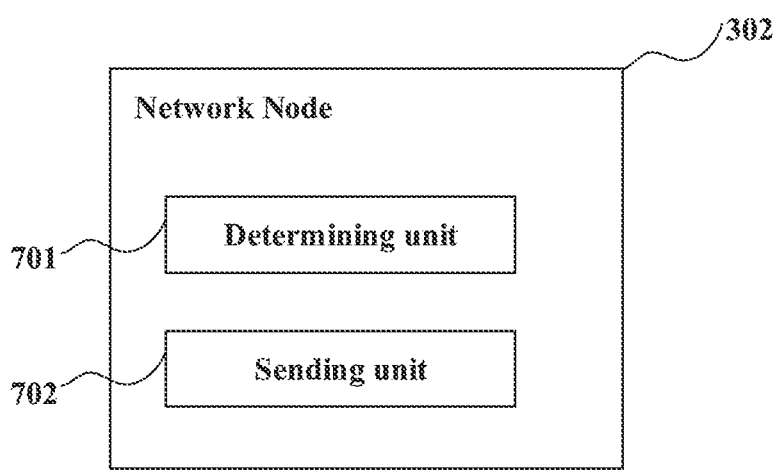
FIG. 7 is a schematic block diagram showing an example network node, according to the embodiments.

Reference is now made to FIG. 7, which is a schematic block diagram showing an example network node 302, according to some embodiments. In some embodiments, the network node 302 may include a determining unit 701 and a sending unit 702. In some embodiments, the determining unit 701 and the sending unit 702 can be configured to perform operations described herein.

In some embodiments, the determining unit 701 may determine a timing advance (TA) offset for uplink/downlink switching, wherein the TA offset is to be applied in the uplink communication from the wireless communication device 301 to the network node 302. In one embodiment, the determining unit 701 may determine the TA offset at least based on the time offset requirement for uplink/downlink switching in different scenarios used in communication between the wireless communication device and a network node. The different scenarios may include but are not limited to different frame structures, different frequency band, coexisting with LTE, etc.

For example, in some embodiments, a constant time may be defined for different frame structures and different frequency bands. In some embodiments, for TDD, the TA offset value is around 20 μs for below 6 GHz case and 10 μs for above 6 GHz case. For non-TDD (such as FDD), the TA offset value may be 0.

In some embodiments, the frequency band definition may specify the minimum switching time that the UE may assume. Examples of corresponding TA offset values may include 0 for non-TDD (such as FDD) band, 624*64 $T_c$: TDD in bands below 6 GHz, and/or 312*64 $T_c$: TDD in bands above 6 GHz.

In one embodiment, the TA offset for 6 GHz frequency band can be set by referring the case of below 6 GHz or the case of above 6 GHz. For example, the TA offset for 6 GHz frequency band can be set as 10 μs or 312*64 $T_c$.

In some embodiments, the determining unit 701 may determine the timing advance TA corresponding to the propagation delay.

In some embodiments, the TA corresponding to the propagation delay is maintained by the network node 302 through timing advance commands (TACs), such as timing alignment commands, which may be sent to the wireless communication device 301 based on measurements on UL transmissions from that wireless communication device 301.

In some embodiments, the network node 302 measures two-way propagation delay or round trip time for each wireless communication device 301 to determine the value of the TA required for that wireless communication device 301.

In some embodiments, the sending unit 702 may send the determined TA offset to the wireless communication device 301. In some embodiments, the determined TA offset and the timing advance corresponding to the propagation delay may be merged into the Timing Advance (TA) command, and sent in the RAR message. In some other embodiments, the determined TA offset may be sent in any other message, and the timing advance command may include only the timing advance corresponding to the propagation delay. In yet further embodiments, the determined TA offset may be sent in any field in RAR message and/or in any other message to the wireless communication device. In some embodiments, the TA offset may take for example but not limit to two or three bits in the message.

Figure 8:
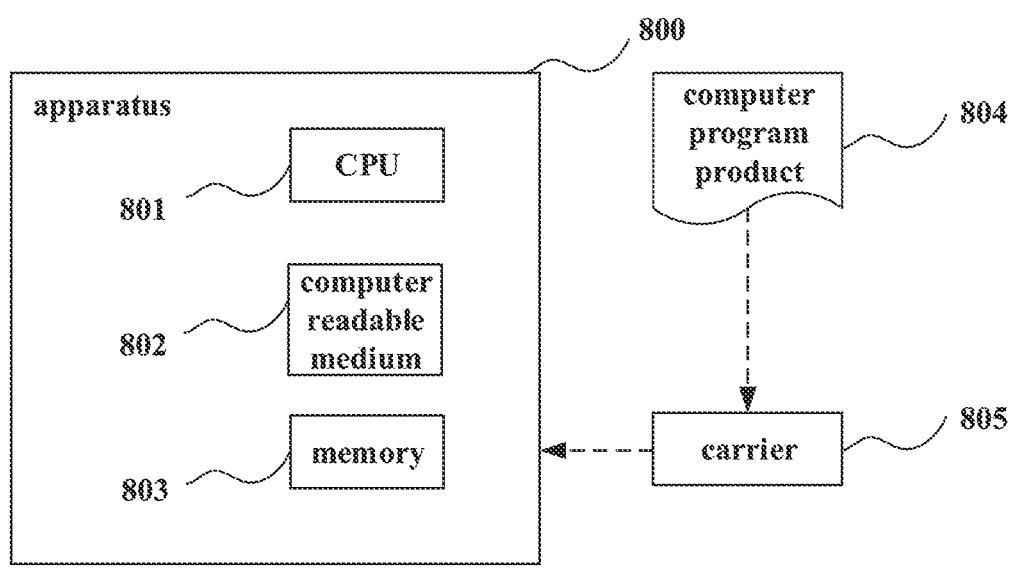
FIG. 8 is a schematic block diagram showing an apparatus, according to the embodiments.

Reference is now made to FIG. 8, which is a schematic block diagram showing an apparatus 800, according to some embodiments. In some embodiments, the apparatus 800 can be configured as the above-mentioned apparatus, such as the wireless communication device 301 and/or the network node 302.

In some embodiments, the apparatus 800 may include but is not limited to at least one processor such as Central Processing Unit (CPU) 801, a computer-readable medium 802, and a memory 803. The memory 803 may include a volatile (e.g. Random Access Memory, RAM) and/or non-volatile memory (e.g. a hard disk or flash memory). In some embodiments, the computer-readable medium 802 may be configured to store a computer program and/or instructions, which, when executed by the processor 801, causes the processor 801 to carry out any of the above mentioned methods.

In some embodiments, the computer-readable medium 802 (such as non-transitory computer readable medium) may be stored in the memory 803. In some embodiments, the computer program can be stored in a remote location for example computer program product 804, and accessible by the processor 801 via for example carrier 805.

The computer-readable medium 802 and/or the computer program product 804 may be distributed and/or stored on a removable computer-readable medium, e.g. diskette, CD (Compact Disk), DVD (Digital Video Disk), flash or similar removable memory media (e.g. compact flash, SD (secure digital), memory stick, mini SD card, MMC multimedia card, smart media), HD-DVD (High Definition DVD), or Blu-ray DVD, USB (Universal Serial Bus) based removable memory media, magnetic tape media, optical storage media, magneto-optical media, bubble memory, or distributed as a propagated signal via a network (e.g. Ethernet, ATM, ISDN, PSTN, X.25, Internet, Local Area Network (LAN), or similar networks capable of transporting data packets to the infrastructure node).

Figure 9:
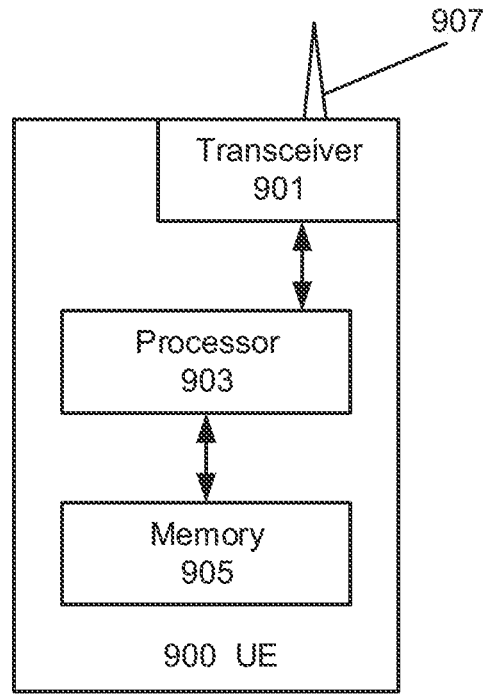
FIG. 9 is a block diagram illustrating elements of a UE configured to operate according to some embodiments disclosed herein.

FIG. 9 is a block diagram illustrating elements of a UE 900 (also referred to as a wireless terminal, a mobile equipment (ME), a wireless communication device, a wireless communication terminal, user equipment, a user equipment node/terminal/device, etc.) configured to operate according to embodiments disclosed herein. As shown, the UE 900 may include at least one antenna 907 (also referred to as antenna), and at least one transceiver circuit 901 (also referred to as transceiver) including a transmitter and a receiver configured to provide uplink and downlink radio communications with a base station or other radio transceiver element of a radio access network. The UE 900 may also include at least one processor circuit 903 (also referred to as processor) coupled to the transceiver 901, and at least one memory circuit 905 (also referred to as memory) coupled to the processor 903. The memory 905 may include computer readable program code that when executed by the processor 903 causes the processor 903 to perform operations according to embodiments disclosed herein for a UE. According to other embodiments, processor 903 may be defined to include memory so that a separate memory circuit is not required. The UE 900 may also include an interface (such as a user interface) coupled with processor 903.

As discussed herein, operations of the UE 900 may be performed by processor 903 and/or transceiver 901. Alternatively, or additionally, the UE 900 may include modules, e.g., software and/or circuitry, that performs respective operations (e.g., operations discussed herein with respect to example embodiments of UEs).

Figure 10:
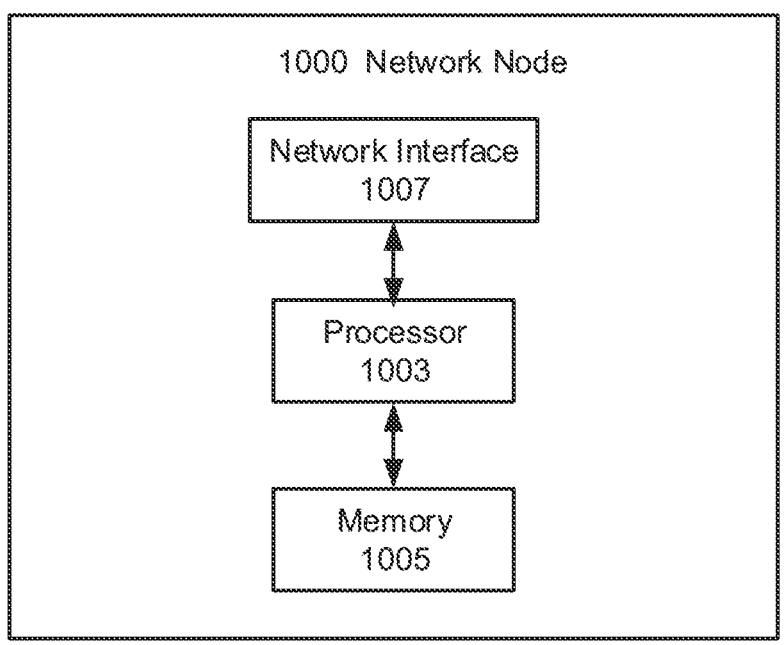
FIG. 10 is a block diagram illustrating elements of a network node according to some embodiments disclosed herein.

FIG. 10 is a block diagram illustrating elements of a network node 1000 according to one or more embodiments disclosed herein. As shown, the network node 1000 may include at least one network interface circuit 1007 (also referred to as a network interface) configured to provide communications with other network nodes, such as one or more nodes of a access network, a core network, and/or another system node. The network node 1000 may also include at least one processor circuit 1003 (also referred to as a processor) coupled to the network interface 1007, and at least one memory circuit 1605 (also referred to as memory) coupled to the processor 1003. The memory 1005 may include computer readable program code that when executed by the processor 1003 causes the processor 1003 to perform operations according to embodiments disclosed herein for a network node. According to other embodiments, processor 1003 may be defined to include memory so that a separate memory circuit is not required.

As discussed herein, operations of the network node 1000 may be performed by processor 1003 and/or network interface 1007. For example, processor 1003 may control network interface 1007 to send communications through network interface 1007 to one or more other network nodes and/or other system nodes, and/or to receive communications through network interface 1007 from one or more other network nodes and/or other system nodes. Alternatively, or additionally, the network node 1000 may include modules, e.g., circuitry, that performs respective operations (e.g., operations discussed herein with respect to example embodiments of network nodes).

In some embodiments, some or all of the operations described herein may be implemented as virtual components executed by one or more virtual machines implemented in one or more virtual environments hosted by one or more of network nodes. Further, in embodiments in which the virtual node is not a radio access node or does not require radio connectivity (e.g., a core network node), then the network node may be entirely virtualized.

The operations may be implemented by one or more applications (which may alternatively be called software instances, virtual appliances, network functions, virtual nodes, virtual network functions, etc.) operative to implement some of the features, functions, and/or benefits of some of the embodiments disclosed herein. Applications are run in a virtualization environment which provides hardware comprising processing circuitry and memory. Memory contains instructions executable by processing circuitry whereby application is operative to provide one or more of the features, benefits, and/or functions disclosed herein.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of the disclosed subject matter may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of disclosed subject matter. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the disclosed subject matter. All such variations and modifications are intended to be included herein within the scope of the disclosed subject matter. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of the disclosed subject matter is to be determined by the broadest permissible interpretation of the present disclosure including the following examples of embodiments and their equivalents, and shall not be restricted or limited by the foregoing detailed description.

ABBREVIATIONS

3GPP third Generation Partnership Project
5G 5th-generation mobile communication technology
DL Downlink
FDD Frequency Division Duplex
LTE Long-Term Evolution
NR New Radio
OFDM Orthogonal Frequency Division Multiplexing
RAN Radio Access Network
RAR Random Access Response
SCS Sub-Carrier Spacing.
TA Timing Advance
TAC Timing Advance Command
TDD Time Division Duplex
UE User Equipment
UL Uplink

FURTHER DEFINITIONS AND EMBODIMENTS

In this disclosure a receiving node and a transmitting node is referred to. In the embodiments in one example the transmitting node can be a UE and the receiving node can be a network node. In another example the transmitting node can be a network node and the receiving node can be a UE. In yet another example the transmitting and receiving node can be involved in direct device to device communication, that is both can be considered UEs. Examples of device to device communication are proximity service (ProSe), ProSe direct discovery, ProSe direct communication, V2X (where X can denote V, I or P e.g. V2V, V2I, V2P etc) etc.

A network node is a more general term and can correspond to any type of radio network node or any network node, which communicates with a UE and/or with another network node. Examples of network nodes are NodeB, base station (BS), multi-standard radio (MSR) radio node such as MSR BS, eNodeB, gNodeB. MeNB, SeNB, network controller, radio network controller (RNC), base station controller (BSC), road side unit (RSU), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC) etc.

Another example of a node could be user equipment, this is a non-limiting term user equipment (UE) and it refers to any type of wireless device communicating with a network node and/or with another UE in a cellular or mobile communication system. Examples of UE are target device, device to device (D2D) UE, V2X UE, ProSe UE, machine type UE or UE capable of machine to machine (M2M) communication, PDA, iPAD, Tablet, mobile terminals, smart phone, laptop embedded equipped (LEE), laptop mounted equipment (LME), USB dongles etc.

The term radio access technology, or RAT, may refer to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs. The term signal used herein can be any physical signal or physical channel. Examples of downlink physical signals are reference signal such as PSS, SSS, CRS, PRS, CSI-RS, DMRS, NRS, NPSS, NSSS, SS, MBSFN RS etc. Examples of uplink physical signals are reference signal such as SRS, DMRS etc. The term physical channel (e.g., in the context of channel reception) used herein is also called as 'channel'. The physical channel carries higher layer information (e.g. RRC, logical control channel etc). Examples of downlink physical channels are PBCH, NPBCH, PDCCH, PDSCH, sPDSCH, MPDCCH, NPDCCH, NPDSCH, E-PDCCH etc. Examples of uplink physical channels are sPUCCH. sPUSCH, PUSCH, PUCCH, NPUSCH, PRACH, NPRACH etc.

The term time resource used herein may correspond to any type of physical resource or radio resource expressed in terms of length of time and/or frequency. Signals are transmitted or received by a radio node over a time resource. Examples of time resources are: symbol, time slot, subframe, radio frame, TTI, interleaving time, etc.

Figure 11:
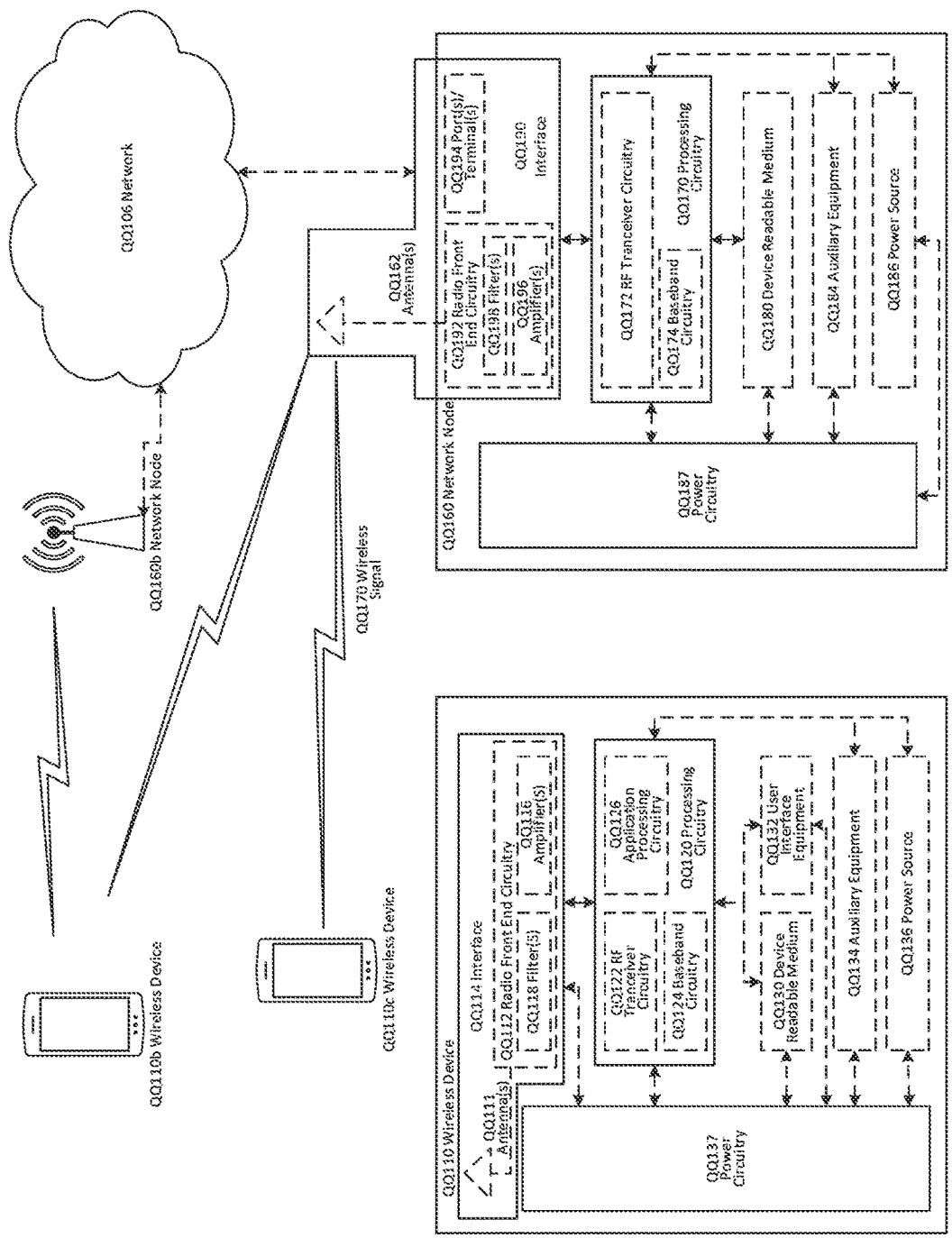
FIG. 11 is a schematic block diagram illustrating a wireless network including some embodiments disclosed herein.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signaling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 11 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE) and mobile equipment (ME). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). A vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 12:
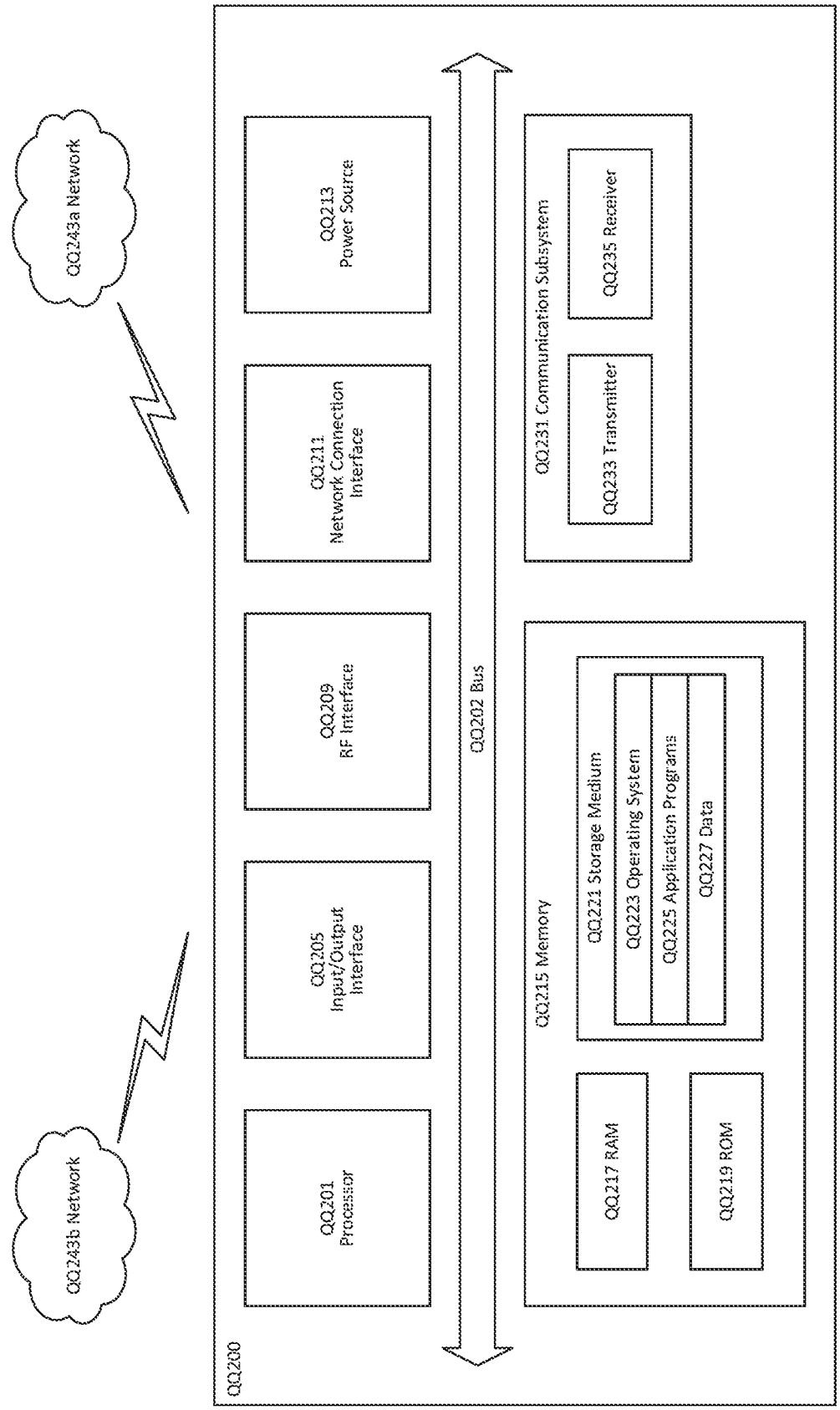
FIG. 12 is a schematic block diagram illustrating some embodiments of a UE in accordance with various embodiments disclosed herein.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 12, is one example of a WD configured for communication in accordance with one or more communication standards promulgated by the 3rd Generation Partnership Project (3GPP), such as 3GPP's GSM, UNITS, LTE, and/or 5G standards. As mentioned previously, the term WD and UE may be used interchangeably. Accordingly, although FIG. 12 is a UE, the components discussed herein are equally applicable to a WD, and vice-versa.

In FIG. 12, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 12, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 13:
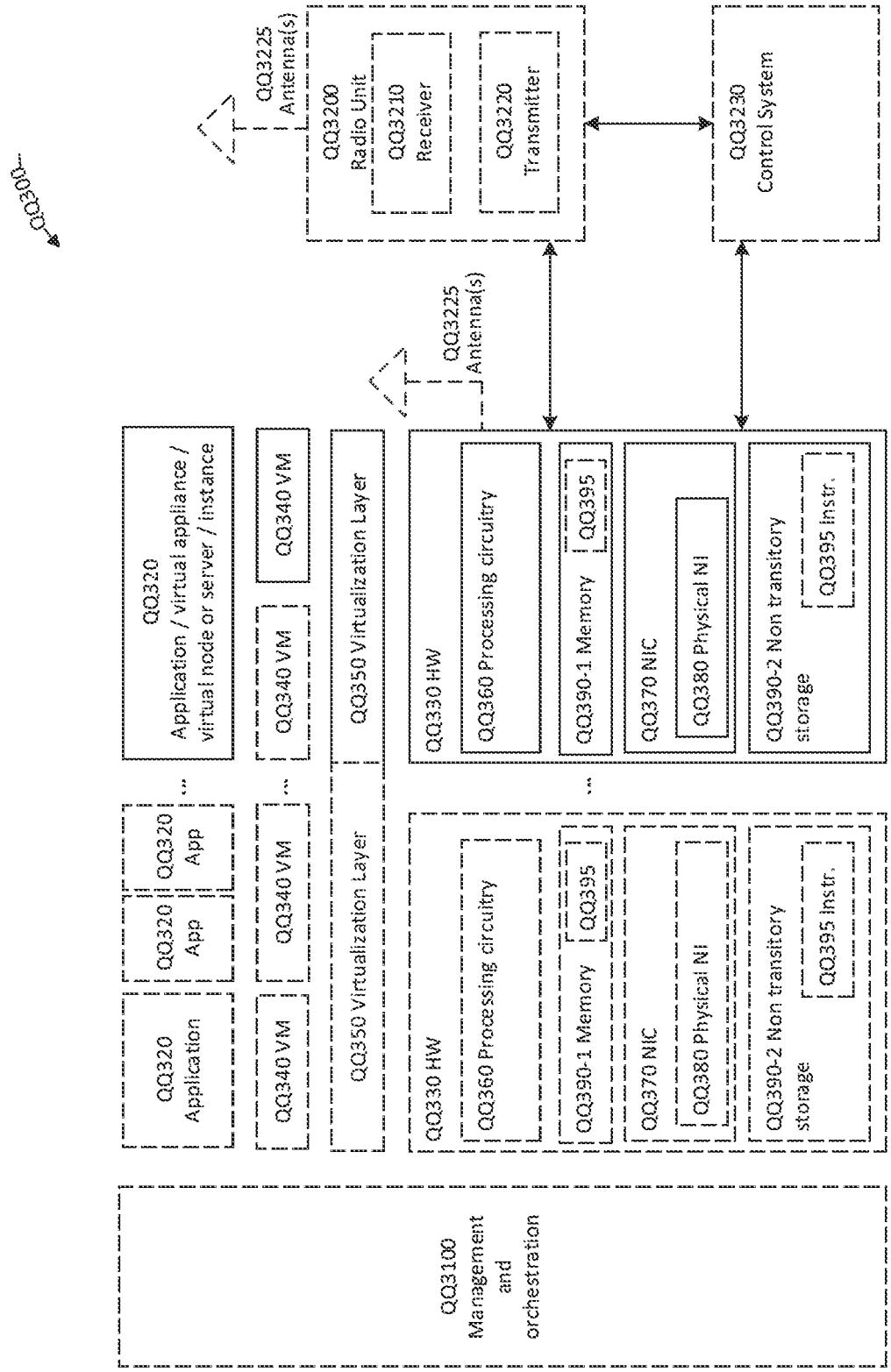
FIG. 13 is a schematic block diagram illustrating a virtualization environment in which functions implemented by some embodiments disclosed herein may be virtualized.

FIG. 13 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 13, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 13.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signaling can be effected with the use of control system QQ3230 which may alternatively be used for communication between the hardware nodes QQ330 and radio units QQ3200.

Figure 14:
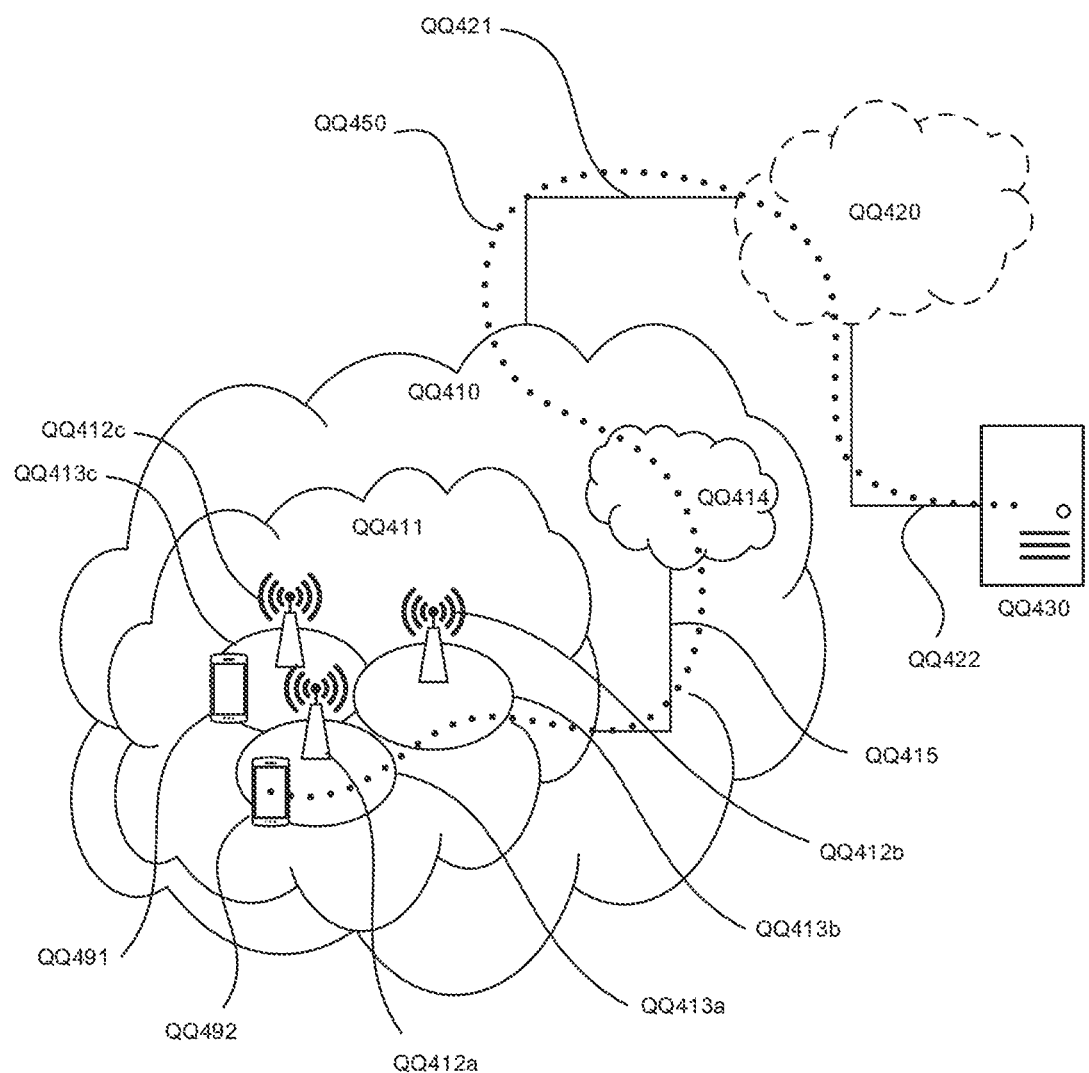
FIG. 14 is a schematic block diagram illustrating a communication system including a telecommunication network that includes an access network and a core network according to some embodiments disclosed herein.

With reference to FIG. 14, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NB s, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 14 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 15. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 15) served by base station QQ520. Communication interface QQ526 may be configured to facilitate connection QQ560 to host computer QQ510. Connection QQ560 may be direct or it may pass through a core network (not shown in FIG. 15) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 15:
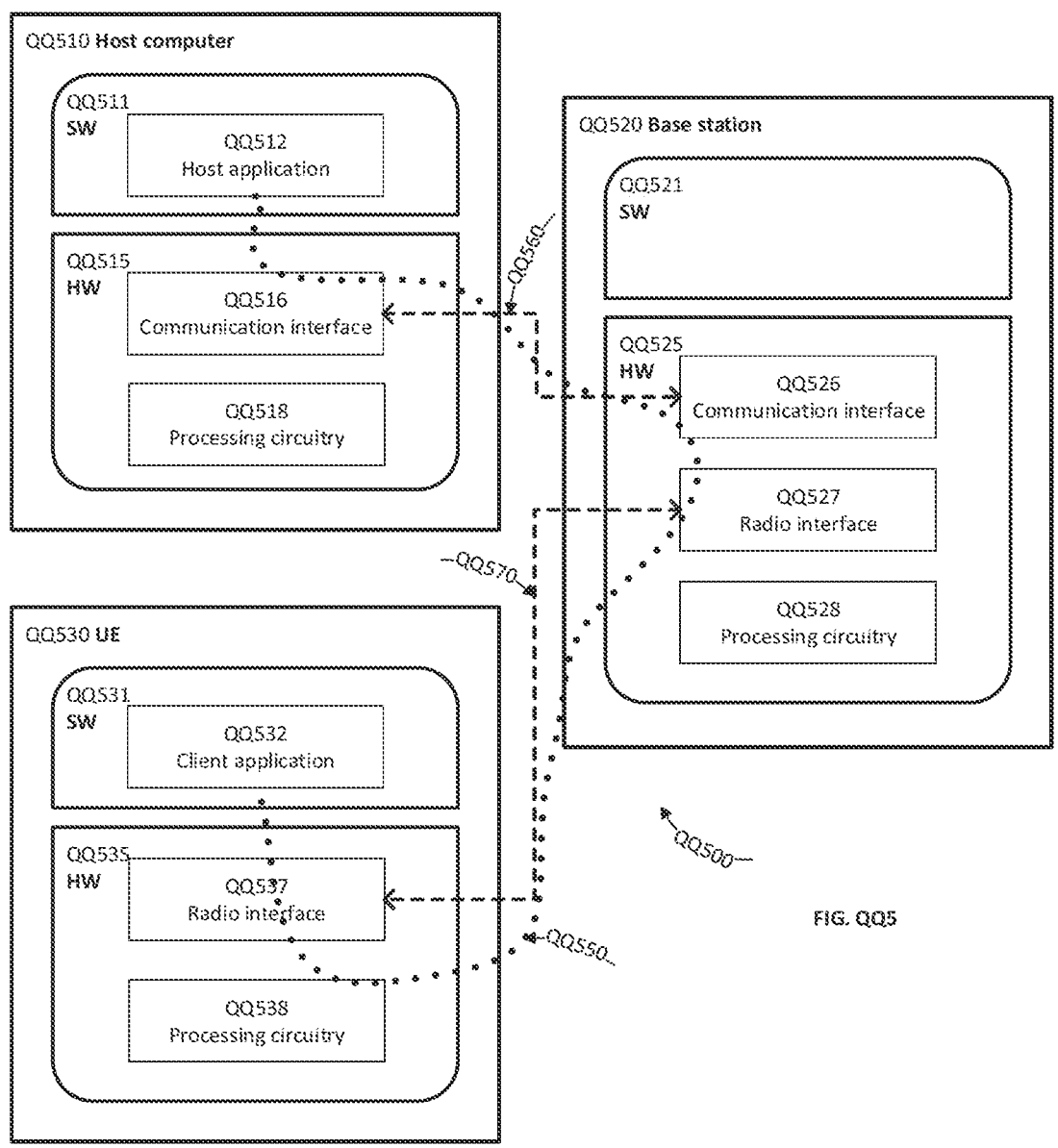
FIG. 15 is a schematic block diagram illustrating a UE, a base station and a host computer according to some embodiments disclosed herein.

It is noted that host computer QQ510, base station QQ520 and UE QQ530 illustrated in FIG. 15 may be similar or identical to host computer QQ430, one of base stations QQ412a, QQ412b, QQ412c and one of UEs QQ491, QQ492 of FIG. 14, respectively. This is to say, the inner workings of these entities may be as shown in FIG. 15 and independently, the surrounding network topology may be that of FIG. 14.

In FIG. 15, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 16:
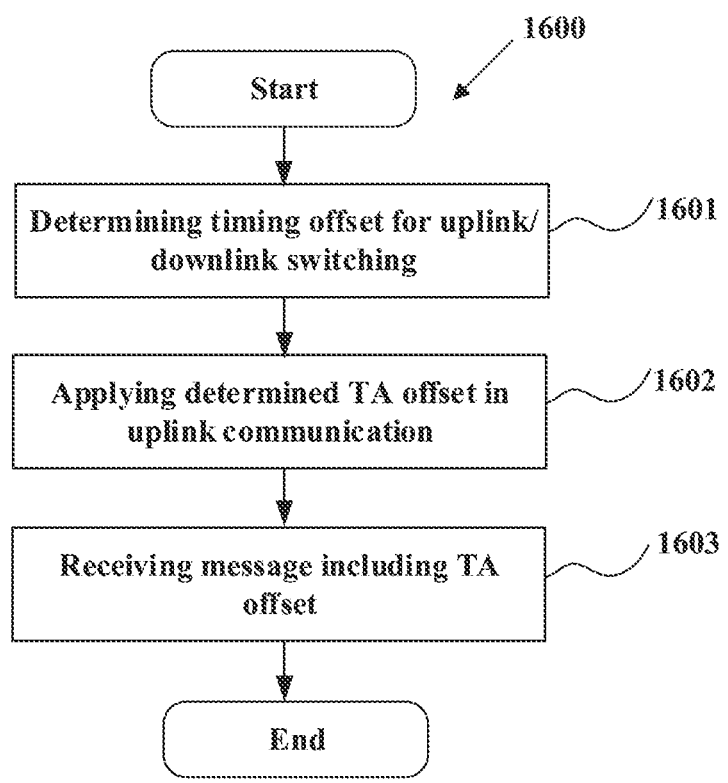
FIG. 16 is a block diagram illustrating operations of methods of operating a wireless communication device according to some embodiments disclosed herein.

Reference is now made to FIG. 16, which is a block diagram illustrating operations of methods of operating a wireless communication device according to some embodiments herein. Such methods 1600 may include determining a timing advance (TA) offset for uplink/downlink switching (block 1601). Some embodiments provide that the TA offset is based on a time offset requirement for uplink/downlink switching in different configurations used in communication between the wireless communication device and a network node. Some embodiments provide that the wireless communication device includes a user equipment (UE). In some embodiments, the TA offset is predefined constant value for a particular frequency band and a particular frame structure and the particular frame structure includes one of a plurality of duplex modes.

In some embodiments, the TA offset is included in a TA command (TAC). In some embodiments, the TA offset value depends on the frequency band. Some embodiments provide that the TA offset has a first TA offset value for a first frequency band that is below a frequency threshold for a time division duplex and a second TA offset value for a second frequency band that is equal to or above the frequency threshold.

Some embodiments provide that the first TA offset value is different than the second TA offset value. For example, some embodiments provide that the first TA offset value is greater than the second TA offset value. In some embodiments, the TA offset is 0 for non-time division duplex (non-TDD). In some embodiments, the frequency threshold is about 6 GHz. In such embodiments, the first TA offset may be about 20 μs, and the second TA offset may be about 10 μs. Such values are non-limiting examples as the frequency threshold may be more or less than 6 Ghz, the first TA offset may be more or less than 20 μs, and the second TA offset may be more or less than 10 μs.

Embodiments may include applying the determined TA offset in an uplink communication from the wireless communication device to the network node (block 1602). In some embodiments, applying the TA offset may include applying a timing advance corresponding to a propagation delay between the wireless communication device and the network node, in addition to the TA offset.

Some embodiments include receiving a message including the TA offset from the network node (block 1603). In such embodiments, applying the determined TA offset may include applying the received TA offset.

Some embodiments provide that the timing advance corresponding to the propagation delay is sent from the network node in a TA command in a RAR message. The TA offset may use two or three bits in the message according to some embodiments. In some embodiments, the TA offset is independent of NR-LTE co-existence.

Figure 17:
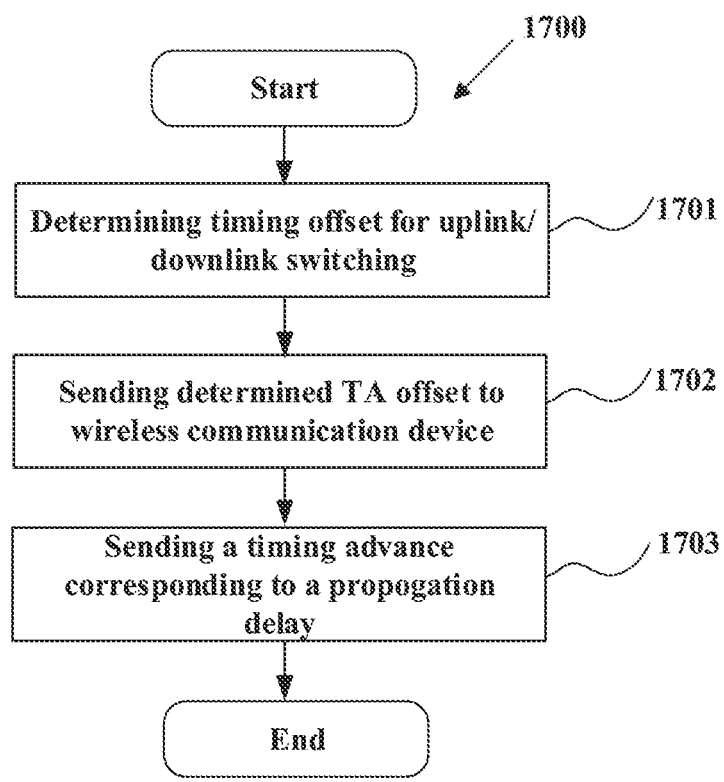
FIG. 17 is a block diagram illustrating operations of methods of operating a network node according to some embodiments disclosed herein.

Reference is now made to FIG. 17, which is a block diagram illustrating operations of methods of operating a network node according to some embodiments herein. Such methods 1700 may include determining a timing advance (TA) offset for uplink/downlink switching (block 1701). Some embodiments provide that the TA offset is based on a time offset requirement for uplink/downlink switching in different configurations used in communication between the network node and a wireless communication device. In some embodiments, the TA offset has a first TA offset value for a first frequency band that is below a frequency threshold for a time division duplex and a second TA offset value for a second frequency band that is equal to or above the frequency threshold. Thus, some embodiments provide that the first TA offset value is different than the second TA offset value. Some embodiments provide that the first TA offset value is greater than the second TA offset value.

In some embodiments, the TA offset corresponds to an uplink communication from the wireless communication device to the network node.

Embodiments may include sending the determined TA offset to the wireless communication device (block 1702). In some embodiments, the TA offset is sent in a random access response (RAR) message, while in other embodiments the TA offset is included in a TA command (TAC). Some embodiments provide that the TA offset takes two or three bits.

Operations according to some embodiments include sending a timing advance corresponding to a propagation delay between the wireless communication device and the network node to the wireless communication device, in a TA command in a RAR message (block 1703).

Some embodiments provide that the TA offset value depends on the frequency band. For example, according to some non-limiting embodiments, the frequency threshold may be about 6 GHz, the first TA offset may be about 20 μs, and the second TA offset may be about 10 μs. In some embodiments, a non-time division duplex (non-TDD) may use a TA offset of 0.

In some embodiments, the TA offset is predefined constant value, for a particular frequency band and a particular frame structure. Examples of different frame structures may include different duplex modes. Some embodiments provide that the TA offset is independent of NR-LTE co-existence.

What is claimed is:

1. A client application stored on a non-transitory computer-readable storage medium and associated with a wireless communication device operable in a wireless communication network, the client application executable on the wireless communication device to transmit user data to a host application associated with a host computer providing an over-the-top (OTT) service via the wireless communication network, the client application being operable to: initiate transmission of the user data to the host application, the wireless communication device being configured to perform operations comprising:
determining a timing advance (TA) offset for uplink-downlink switching, wherein:
the TA offset depends on a duplex mode of a cell in which an uplink transmission occurs from the wireless communication device to a network node and depends on a frequency range of the uplink transmission, and
the TA offset has a first TA offset value for a first frequency band that is below a frequency threshold for a time division duplex mode and a second TA offset value for a second frequency band that is greater than or equal to the frequency threshold; and
applying the determined TA offset in the uplink transmission, the uplink transmission including the user data.

2. The client application of claim 1, wherein the TA offset depends on whether the frequency range is a first frequency range or a second frequency range, wherein the first frequency range is a frequency range above 6 GHz and the second frequency range is a frequency range below 6 GHz.

3. The client application of claim 1, wherein the first TA offset value is different than the second TA offset value.

4. The client application of claim 3, wherein the frequency threshold is about 6 GHZ, the first TA offset is about 20 μs, and the second TA offset is about 10 μs.

5. The client application of claim 1, wherein applying the TA offset further comprises:
applying a timing advance corresponding to a propagation delay between the wireless communication device and the network node, in addition to the TA offset,
wherein the timing advance corresponding to the propagation delay is sent from the network node in a TA command in a random access response (RAR) message.

6. A wireless communication device having a client application stored in a non-transitory computer-readable storage medium, the client application being associated with an over-the-top (OTT) service and executable on the wireless communication device to transmit user data to a host application associated with the OTT service via a wireless communication network, the client application being operable to initiate transmission of the user data to the host application by processing circuitry and transceiver circuitry of the wireless communication device, the wireless communication device being configured to perform operations comprising:
determining a timing advance (TA) offset for uplink-downlink switching, wherein:
the TA offset depends on a duplex mode of a cell in which an uplink transmission occurs from the wireless communication device to a network node and depends on a frequency range of the uplink transmission, and
the TA offset has a first TA offset value for a first frequency band that is below a frequency threshold for a time division duplex mode and a second TA offset value for a second frequency band that is greater than or equal to the frequency threshold; and
applying the determined TA offset in the uplink transmission; and
transmitting or receiving user data utilizing the TA offset.

7. The wireless communication device of claim 6, wherein the processing circuitry is further configured to, when applying the TA offset:

apply a timing advance corresponding to a propagation delay between the wireless communication device and the network node, in addition to the TA offset, wherein the timing advance corresponding to the propagation delay is sent from the network node in a TA command in a random access response (RAR) message.

8. The wireless communication device of claim 6, wherein the TA offset has a first TA offset value for a first frequency band that is below a frequency threshold for a time division duplex and a second TA offset value for a second frequency band that is equal to or above the frequency threshold, wherein the first TA offset value is greater than the second TA offset value.

9. The wireless communication device of claim 8,
wherein the frequency threshold is about 6 GHZ,
wherein the first TA offset is about 20 μs, and
wherein the second TA offset about 10 μs.

10. The wireless communication device of claim 6, wherein for non-time division duplex, non-TDD, the TA offset is 0.

11. The wireless communication device of claim 6, wherein the first TA offset value is different than the second TA offset value.

12. A host computer configured to operate in a communication system to provide an over-the-top (OTT) service, the host computer comprising:

processing circuitry configured to initiate transmissions to receive or provide user data associated with the OTT service; and a network interface configured to facilitate reception or transmission of the user data from a user equipment (UE) via a network node in a cellular network, the network node having a communication interface and processing circuitry, the processing circuitry of the network node configured to perform operations comprising:

determining a timing advance (TA) offset for uplink-downlink switching, wherein:

the TA offset depends on a duplex mode of a cell in which an uplink transmission occurs from a wireless communication device to the network node and depends on a frequency range of the uplink transmission, and the TA offset has a first TA offset value for a first frequency band that is below a frequency threshold for a time division duplex mode and a second TA offset value for a second frequency band that is greater than or equal to the frequency threshold;

sending the determined TA offset to the wireless communication device; and receiving user data from the UE transmitted based on the TA offset.

13. The network node of claim 12, wherein the TA offset is sent in a random access response, (RAR) message.

14. The network node of claim 12, wherein the processing circuitry is further configured to send a timing advance corresponding to a propagation delay between the wireless communication device and the network node to the wireless communication device, in a TA command in a random access response (RAR) message.

15. The network node of claim 12, wherein the TA offset has a first TA offset value for a first frequency band that is below a frequency threshold for a time division duplex and a second TA offset value for a second frequency band that is equal to or above the frequency threshold, wherein the first TA offset value is greater than the second TA offset value.

16. The network node of claim 15,
wherein the frequency threshold is about 6 GHZ,
wherein the first TA offset is about 20 μs, and
wherein the second TA offset is about 10 μs.

17. The host computer of claim 12, wherein:
the processing circuitry of the host computer is configured to execute a host application that utilizes the user data; and the wireless communication device comprises processing circuitry configured to execute a client application associated with the host application to transmit the user data to the host computer.

18. The network node of claim 12, wherein the first TA offset value is different than the second TA offset value.

* * * * *